United States Patent Office 2,973,272
Patented Feb. 28, 1961

2,973,272

PROCESS FOR TREATING COCONUT AND EDIBLE PRODUCT

Adolph A. Winston, Union County, and Daniel J. Kelley, Fair Lawn, N.J., assignors to General Foods Corporation, White Plains, N.Y., a corporation of Delaware No Drawing. Filed Jan. 19, 1959, Ser. No. 787,332

9 Claims. (Cl. 99—125)

This invention relates to a process for treating coconut and to the novel edible product so prepared.

The "yellowing" of coconut during storage is a major problem. Apparently, such yellowing is due to a reaction which takes place between the amino acids and reducing sugars contained in the coconut. The rate of yellowing seems to depend on the maturity of the coconut, the temperature of its storage, and the like, and although the lapse of time within which yellowing begins varies, it probably starts when the coconut is severed from the tree. The ordinary product of commerce which has been shredded and dried as soon as possible after harvesting begins to yellow 1–3 months later under usual conditions.

Heretofore, $SO_2$ gas has been used in the fumigation of copra for the purpose of preventing insect and bacterial spoilage, and it has been noticed that at the high $SO_2$ level required for such fumigation, yellowing is forestalled. But the resulting $SO_2$ residuals are too high to be used in food products, being of the order of several thousand parts per million and not only raising toxicity problems, but also imparting off-flavors to the product.

By $SO_2$ residual as used herein is meant the amount of sulfur-containing compound or compounds in the product as determined by the gravimetric Monier-Williams method for $SO_2$ described in the A.O.A.C. VII, 27–51, p. 471, September 15, 1951, which is accurate to about ±20 parts per million at low levels. If a coconut product contains more than about 250 parts per million of $SO_2$ residual, it is unacceptable because of off-flavor. Some people can regularly detect $SO_2$ residuals in coconut products at levels as low as 150 parts per million, and it is therefore preferred that products which are to be distributed to the general public have a residual at the time of eating of well below about 100 parts per million.

It has heretofore been found possible to treat coconut (e.g. by the process disclosed in U.S. Patent 2,783,152) to impart to it a storage life of up to 9–12 months without any evidence of yellowing. Although this represents a substantial improvement over earlier processes, it is still desired in commercial practice to obtain a coconut which has a storage life of 10–18 months. Furthermore, it has also been observed that under conditions which accelerate deterioration, particularly high temperature up to e.g. 100° F., the storage life is decreased considerably.

It would appear that these defects could be eliminated by treating the coconut with greater amounts of sulfur-dioxide-containing materials, or by extending the time of treatment. However, these alternatives do not in fact provide any additional storage life, but rather do they increase the amount of sulfur dioxide present which renders the resulting product inedible.

Various other materials and treating techniques have been tried to get an edible coconut having a longer storage life than 9–12 months. For example, use of calcium chloride, in dry form or aqueous solution, in amounts sufficiently low to give a satisfactorily flavored product, is found to give substantially no improvement at all in the storage life of the product. In view of the uniform lack of success of these other techniques, coconut has been uniformly treated by sulfur-dioxide techniques.

It is an object of this invention to disclose a technique for treating coconut which gives an edible product having an improved storage life. Another object of this invention is to provide a novel product capable of being stored for extended periods of time. Other objects will be apparent to those skilled in the art on inspection of the following description.

In the manufacture of comminuted edible coconut products in accordance with certain aspects of this invention, coconut meat may be treated to inhibit subsequent discoloration thereof by the process which comprises contacting the meat of the inner surface of the nut endosperm with aqueous calcium and sulfur-dioxide-containing solution and then forming a comminuted, i.e. shredded, flaked or ground mixture of the treated and untreated meat of the nut endosperm whereby yellowing of the nut meat during subsequent commercial storage and distribution of said mixture is substantially prevented.

The $SO_2$-bearing material used to treat the nuts must be edible, i.e., non-toxic in the amounts used, and also compatible with the coconut, i.e., it must not impart objectionable off-flavors thereto. Subject to these limitations any of various materials can be used, sometimes in dry form as a powder, dust, or the like, but more often and preferably in the form of an aqueous solution at either alkaline or acidic pH's. Examples of sulfur-dioxide-containing solution are: sulfurous acid solution; solutions of alkali (including ammonium) salts of sulfurous acid, either partially or fully neutralized, such as sodium bisulfite and sodium sulfite; and the molecularly dehydrated pyrosulfites and metabisulfites such as sodium metabisulfite and potassium metabisulfite. Such compounds permit the use of a pH range of the treating solution within the range of about 2.5–9, but since relatively dilute solutions are used in practice the usual pH range will be much narrower. It will be understood that these specific compounds are only by way of example.

The calcium-containing material used to treat the nuts must also be edible, i.e. non-toxic in the amounts used, and also compatible with the coconut, i.e. it must not impart objectionable off-flavors thereto. Subject to these limitations, various materials may be used, sometimes in dry form but preferably in the form of an aqueous solution. Typical of the materials which can be employed are calcium sulfite, calcium bisulfite, calcium metabisulfite, etc. The preferred material is calcium chloride.

Although the advantages of this invention may be obtained when the coconut is treated with calcium before or after it is treated with the sulfur-dioxide-containing material, under preferred conditions of operation, the calcium and the sulfur-dioxide-containing material will be in the same solution. Under these conditions there may be formed within the solution, calcium metabisulfite, and the solution typically containing calcium chloride and sodium metabisulfite may be referred to as containing calcium metabisulfite.

For convenience and because it is preferred, sodium metabisulfite ($Na_2S_2O_5$) may be referred to in the detailed description as the bisulfite source. The concentration of the $SO_2$-containing material in the solution and the length of time the coconut meat remains in contact with the solution govern the whiteness retention of the coconut or protection against yellowing. If the concentration is too low, the contact times required to effect the desired protection are excessive, and in the case of dipping procedures, water soluble materials in the coconut may be leached out. On the other hand, if the concentration is too high, the corresponding contact time is too short to permit adequate control. In the case of sodium metabisulfite, saturated solutions can be employed but are not practical because of the extreme difficulty with control, as well as the possibility of odor and the general wastefulness of the material. For practical purposes, therefore, a range of concentrations of about 0.1–3.0% by weight of metabisulfite is suitable for aqueous solutions used for contact by dipping, the preferred range being about 0.25–1.0%. Other $SO_2$-containing materials such as those mentioned above may be used in amounts capable of providing equivalent $SO_2$ concentrations, having in mind the variations in molecular weight between $H_2SO_3$, $NaHSO_3$, $Na_2SO_3$, etc.

For convenience, and because it is preferred, calcium chloride will be referred to particularly in the more detailed description as the calcium source. The concentration of calcium chloride solution (expressed on the basis of anhydrous calcium chloride, although of course it will not be necessary to use the anhydrous material) will preferably be about 1%–5%, preferably 2%. The amount of calcium present in the solution will typically be such that the weight ratio of calcium to metabisulfite i.e. ($Ca^{++}/S_2O_5^{=}$) will be 1.5:1 to 2.0:1 and preferably about 1.75:1. Use of ratios outside this range does not permit attainment of the same extended storage life.

A typical solution may contain 2% calcium chloride and 0.5% of sodium metabisulfite.

Although it may be possible to effect the desired result by treatment with sulfur-dioxide-containing solution and calcium containing solution separately, it is preferred to use one solution containing both. The preferred manner of treatment is to dip the coconut meat in the calcium metabisulfite solution, although it is possible to swab, spray, or tumble the coconut meat with the calcium metabisulfite. It is, for example, possible to spray a superficially dry calcium metabisulfite including e.g. a mixture of calcium chloride and sodium metabisulfite onto moist coconut.

Preferably the dipping time should be at least one minute, since lack of uniformity in the final product is likely to occur with very short periods. In order to provide the maximum amount of protection against yellowing with the final product having an acceptably low $SO_2$ content, the concentration of sodium metabisulfite required for a dipping time of one minute is about 3%. Similar results can be obtained using a 1% concentration and a dipping time of about 2 minutes; a 0.5% concentration and a dipping time of about 5 minutes; a 0.3% concentration and a dipping time of about 10 minutes; and 0.1% concentration and a dipping time of 30 minutes. The $SO_2$ residual contained in the coconut after dipping at the concentration and for the periods of time just specified followed by thorough washing to remove excess $SO_2$ amounts to only about 100 parts per million by weight. Moreover, after shredding and desiccating to a moisture content of about 2–5%, the $SO_2$ residual falls to about 50 parts per million, and after transportation or storage for as long as three months to about 30 parts per million. This $SO_2$ residual is, of course, still further reduced by the processing involved in sugaring and remoistening the coconut for the preparation of various consumer packs.

The calcium concentration of the treated coconut may be as high as 1200 p.p.m.–1400 p.p.m. (day basis) but typically it is less. Most effective results are obtained when the residual calcium content of the coconut is about 200–300 p.p.m. (dry basis). This amount of calcium has no undesirable effect either on storage life or on flavor.

The product treated in accordance with this invention may be protected against yellowing for periods of time which typically are 16–18 months.

It will be evident that if changed conditions should require greater or lesser protection against yellowing, corresponding changes can be made with respect to the concentration of the dipping solution and/or the time employed for dipping. Generally, as aforementioned, the $SO_2$ residual at the time of consumption should be less than about 100 parts per million. But if the preparation of the product for final consumption were such as to remove a substantial amount of $SO_2$ as by the use of a high temperature, a higher $SO_2$ level would be permissible in the product prior to such preparation which in turn would permit a higher $SO_2$ level to be imparted by the $SO_2$ treatment. Also, if the time required after such treatment for further processing and distribution of the product were to be increased, the $SO_2$ content of the coconut immediately after the $SO_2$ treatment should be increased in order to provide the greater amount of protection needed. In exceptional cases, therefore, the $SO_2$ content after washing may be as high as 500 parts per million.

After the coconut has been treated as described above, it has been found desirable to wash it. It has been discovered that washing can serve to reduce the $SO_2$ content of the coconut by as much as 50–85% without appreciably decreasing the amount of protection against yellowing afforded by the process of the present invention. Also, washing permits far greater uniformity and, therefore, much better control of the process and the amount of treatment given the coconut. Washing may, of course, be carried out in any conventional way as by dipping, spraying, and the like, the time required being determined by the desirability of removing excess $SO_2$ on the one hand, and of avoiding excessive leaching of coconut solids on the other hand. Using water jets under a pressure of about 30 lbs. per sq. in., 5 minutes washing is about optimum. This washing may decrease the calcium content to about 600–700 p.p.m. (dry basis) but preferably to about 75–100 p.p.m. (dry basis).

It appears that dipping the coconut in the solution results in some of the $SO_2$ becoming combined with or tightly held by the coconut with the rest of the $SO_2$ being only loosely held or combined. The latter is that which is removed by washing but which is not responsible to any appreciable degree for the protection against yellowing afforded by the process. As an example of the desirability of washing, whole, capped, coconuts were dipped in a solution containing 2% calcium and 0.5% of sodium metabisulfite for about 5 minutes, and half of these only were washed with cold water jets for 5 minutes; when the entire batch of coconuts were shredded and dried, the washed half had an $SO_2$ content of about 40 parts per million whereas the other half contained about 180 parts per million. Both samples had about the same degree of whiteness retention or protection against yellowing.

In cases where the treatment is applied to the whole meat of the endosperm (i.e. without first separating the inner surface portion from the remainder), the meat can be substantially undivided with excellent results being obtained. It is preferred to use capped, whole coconuts or halved coconuts because as the degree of subdivision increases for any given concentration of $SO_2$-containing material and time of dipping, $SO_2$ residuals likewise increase due to the increased surface exposed to the treatment, but the amount of protection does not increase materially. The amount of protection remains about the same even when this excess $SO_2$ is washed from the coconut and as aforementioned prolonged unnecessary washing is undesirable because it results in loss of coconut solids, the loss reaching as high as 15–20% of the entire endosperm if ordinary coconut shreds are dipped and thoroughly washed. Evidently the treatment affects primarily the inner surface portion of the coconut meat since its effectiveness is not increased by the exposure of fresh surfaces created by subdivision. It is believed that this localization of the effect results from concentration of the reducing sugars of the coconut in the inner surface portion of the meat, probably in a very thin layer at the inside surface of the coconut. If, therefore, the coconut is subdivided to any great extent, increased surface area is exposed to the treatment and increased amounts of $SO_2$ are picked up, but no additional protection is achieved because the additional surface area exposed contains practically no reducing sugars and this excess residual should be removed by washing with the increased opportunity for losses to occur. Of course, a slight degree of subdivision or breakage is without consequence. Thus when the nuts are cut or broken into segments averaging one inch square the increase in $SO_2$ residual after dipping does not result in excessive solubility losses during washing; beyond this degree of subdivision, however, the losses during washing begin to increase rapidly and soon become so large that the cost of the product removes it from the competitive market. The term "segments," as used hereinafter and in the appended claims, is to be understood to mean sections or fragments formed by dividing or breaking the nut endosperm into pieces the average size which is not materially less than about one inch square, in contradistinction to shredded coconut and the like the total surface area of which is many times greater for the same amount of coconut meat.

The process, of course, may be applied to dried coconut but such treatment will be for specialized uses because of the additional drying which would be required and the increased loss of soluble solids which would result. In addition, the process may be applied to coconut which has already begun to yellow in order to prevent further yellowing.

As illustrative examples of the process of the instant invention, the following are noted:

Example I

In this example, which serves as a control for those that follow, coconut meat was cut or broken into pieces about one inch square. These pieces, drained of liquid, and superficially dry, were dipped into water at room temperature, which water was substantially free of sulfur-dioxide-containing materials and of calcium. Dipping time was five minutes and at the end of this time the meat was withdrawn, drained, and surface washed by dipping water at warm temperature for 4 seconds.

This control sample was shredded, dried, sieved, and packed in bags. Analyses indicated that the sulfur dioxide content of this control material was 0 p.p.m. and the calcium content was 123 p.p.m.

The material was subjected to an accelerated storage test at 100° F. and to a standard storage test at room temperature of 70° F. It was found that the portion of material subjected to the accelerated storage test was unsaleably yellow and was unsatisfactory after 2 weeks. The portion of material stored under standard room temperature conditions was unsaleably yellow after about 4 months.

Example II

This example illustrates the technique of U.S. Patent 2,783,152. The procedure and testing in this example were exactly the same as that for Example I, except that the water into which the coconut was dipped contained 0.5% sulfur dioxide. Analysis after the treatment indicated a sulfur dioxide content of 50 p.p.m. and a calcium content of 123 p.p.m. The accelerated storage life was 4 weeks and the standard storage life was 12 months.

Example III

This example illustrates the use of calcium alone. The procedure and testing in this example were exactly the same as that for Example I, except that the water into which the coconut was dipped contained 2% calcium chloride. Analysis after treatment indicated a sulfur dioxide content of 0 p.p.m. and a calcium content of 218 p.p.m. The accelerated storage life was 2 weeks and standard storage life was about 4 months.

Thus it appears that use of calcium chloride alone gives no improvement in storage life of coconut.

Example IV

This example illustrates the technique of the instant invention. The procedure and testing were the same as before, except that the water into which the coconut was dipped contained 2% calcium chloride and 0.5% sulfur dioxide. This corresponds to a calcium metabisulfite solution wherein the ratio of calcium to metabisulfite ($Ca^{++}/S_2O_5^{=}$) is about 1.75.

Analysis after treatment indicated a sulfur dioxide content of 50 p.p.m. and a calcium content of 227 p.p.m. The accelerated storage life was six weeks and the standard storage life was 18 months.

Example V

This example was the same as Example IV except that the calcium metabisulfite solution contained 3% calcium chloride and 1.0% sodium metabisulfite. Analysis indicated a sulfur dioxide content of 150 p.p.m. and a calcium content of 275 p.p.m. Accelerated storage life was 7 weeks and standard storage life was 21 months.

The following tabulation summarizes the results of these tests:

| Example | Solution | | Product | | Storage Life | |
|---|---|---|---|---|---|---|
| | $SO_2$ (as $Na_2S_2O_5$) | Ca | $SO_2$ | Ca | Accel. | Std. |
| | Percent | Percent | P.p.m. | P.p.m. | Wks. | Mo. |
| I (control) | 0 | 0 | 0 | 123 | 2 | 4 |
| II (control) | 0.5 | 0 | 50 | 123 | 4 | 12 |
| III (control) | 0 | 2.0 | 0 | 218 | 2 | 4 |
| IV | 0.5 | 2.0 | 50 | 227 | 6 | 18 |
| V | 1.0 | 3.0 | 150 | 275 | 7 | 21 |

From this tabulation, it is readily possible to draw the following conclusions:

(a) The untreated control of Example I is unsatisfactory in that it has a very short storage life and the control of Example III proves that calcium alone is ineffective in improving the storage life;

(b) Use of sulfur-dioxide-containing solution considerably improves the storage life (Example II);

(c) Use of the technique of the instant invention (Examples IV and V) permits attainment of a storage life which may typically be 50% greater than that of the best prior art technique.

It has been found that even under the most unfavorable conditions, the novel technique gives additional storage life of at least about 4.5 months.

It will be apparent to those skilled in the art that various modifications may be made to the process which come within the scope of the instant invention.

What is claimed is:

1. The process for preparing an edible coconut product characterized by an extended storage life which comprises contacting the meat of the inner surface of the nut endosperm with calcium and sulfur dioxide.

2. The process for preparing edible coconut product characterized by an extended storage life which comprises contacting the meat of the inner surface of the nut endosperm with an aqueous calcium and sulfur-dioxide-containing solution.

3. The process for preparing edible coconut product characterized by an extended storage life which comprises contacting the meat of the inner surface of the nut endosperm with calcium metabisulfite.

4. The process for preparing edible coconut product characterized by an extended storage life which comprises contacting the meat of the inner surface of the nut endosperm with an aqueous calcium chloride and sulfur-dioxide-containing solution.

5. The process for preparing edible coconut product characterized by an extended storage life which comprises contacting the meat of the inner surface of the nut endosperm with an aqueous solution containing 1%–5% calcium chloride and 0.1%–3.0% sodium metabisulfite.

6. The process for preparing edible coconut product characterized by an extended storage life which comprises contacting the meat of the inner surface of the nut endosperm with an aqueous solution containing 1.5–2.0 parts of calcium per part of metabisulfite.

7. The process for preparing edible coconut product characterized by an extended storage life which comprises contacting the meat of the inner surface of the nut endosperm with an aqueous solution containing 1%–5% calcium chloride and 0.1%–3.0% sodium metabisulfite, the amount of calcium being 1.5–2.0 times the amount of metabisulfite.

8. The process for preparing an edible coconut product characterized by an extended storage life which comprises contacting the meat of the inner surface of the nut endosperm with calcium and sulfur dioxide and then forming a comminuted mixture of this treated and untreated nut endosperm.

9. Edible coconut meat protected against yellowing having a residual sulfur dioxide content of less than about 500 p.p.m. and a calcium content of at least about 150 p.p.m. both substantially concentrated in the meat of the inner portion of the coconut endosperm.

References Cited in the file of this patent

UNITED STATES PATENTS

| | | |
|---|---|---|
| 224,883 | Craft | Feb. 24, 1880 |
| 2,417,932 | Kalmar | Mar. 25, 1947 |
| 2,783,152 | De Maya et al. | Feb. 26, 1957 |